United States Patent Office 3,332,858
Patented July 25, 1967

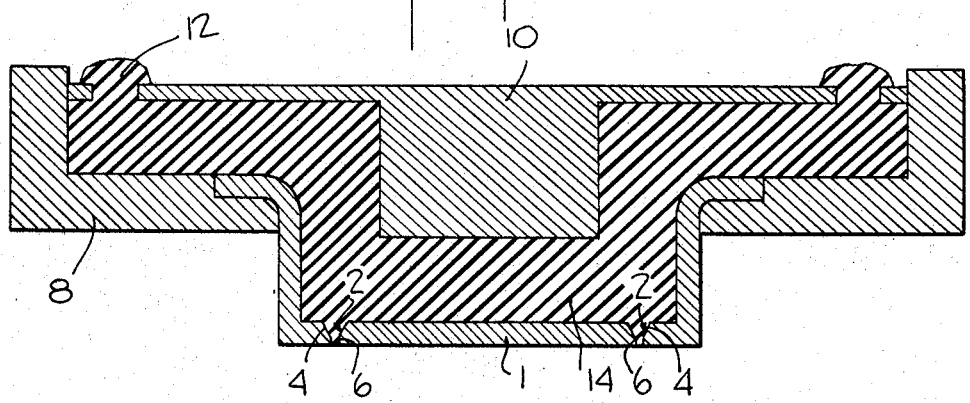
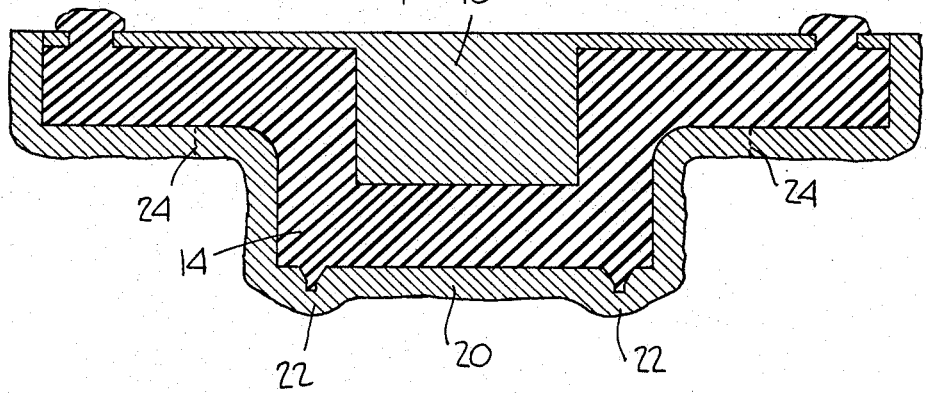

3,332,858
METHOD FOR ELECTROFORMING
SPINNERETTES
Billy D. Bittinger, Pearisburg, Va., assignor to Celanese
Corporation, a corporation of Delaware
Filed Mar. 23, 1964, Ser. No. 354,031
5 Claims. (Cl. 204—11)

ABSTRACT OF THE DISCLOSURE

A process for the production of spinnerettes by forming a mold having rubbery projections which are negatives for the orifices of the spinnerettes and electrodepositing a layer of coherent metal onto the mold, then removing the excess metal from the projections to expose the apertures formed by the projections and complete the spinnerette manufacture.

---

This invention relates to the production of spinnerettes and relates more particularly to the manufacture of such spinnerettes by electroforming.

Spinnerettes for use in the manufacture of fibrous materials usually comprise a disc or cup-shaped extrusion device provided with one or more, usually five or more (e.g. 5 to 400) minute orifices through which the organic viscous filament-forming material is extruded under pressure into a coagulating zone which may, depending on the type of spinning employed, be an evaporative zone (dry-spinning), a zone containing a liquid coagulant (wet-spinning), or a cooling zone (melt-spinning). The small orifices, usually having diameters less than about 400 microns and being less than about 800 microns long, may be of various cross-sections, e.g., circular or triangular, while longitudinally they may be straight, countersunk, double countersunk, parabolic, hyperbolic, etc. The walls of such orifices must be smooth so that the viscous extrusion mass may flow freely over such walls. Examples of various prior art spinnerettes, whose production is within the scope of this invention, are found in U.S. Patents 2,341,555; 2,677,148; 2,742,667; 2,838,364; 2,838,365; 2,910,725; 2,923,969; 2,985,911; 3,001,230 and 3,017,789.

As can be seen from the aforementioned patents, it is customary to produce the spinnerette orifices by drilling, grinding or punching a preformed spinnerette blank, disc or cup. This is a difficult and expensive operation, and often cannot be performed with such accuracy as to produce a spinnerette in which all the orifices are uniform in both longitudinal and transverse section.

The production of spinnerettes for dry-spinning and wet-spinning is particularly difficult and exacting because of the extremely minute size of those portions of the orifices which are of the smallest diameter. These portions, usually known as the capillary portions, of the orifices may have diameters in the range, for example, of 15-75 microns, and, in the case of spinnerettes used for dry-spinning, usually less than 50 microns. The lengths of these capillary portions are, for example, above about 5 microns, and below about 75 microns, usually less than 50 microns. The cylindrical (capillary) portions may be of various cross-sections, e.g. circular, triangular, square, Y-shaped, cruciform, star-shaped, etc. The thickness of the spinnerette, for dry-spinning, is usually above about 0.02 inch, e.g. about 0.03 to 0.1 inch.

It is accordingly one object of this invention to provide a new an deconomical method for the manufacture of spinnerettes, which is particularly suitable for making spinnerettes for dry-spinning.

Other objects of this invention will be apparent from the following detailed description and claims. In this description and claims, all proportions are by weight unless otherwise indicated.

In accordance with one aspect of this invention, there is first produced a spinnerette mold having tiny spaced projections corresponding to the orifices to be formed in the spinnerette. The projections are composed of a rubbery polymer. After the surface of the mold has been rendered conductive, the metal body of the spinnerette is built up thereon by an electroplating process to produce an unfinished spinnerette body having on its inner face tiny spaced depressions corresponding precisely to the projections on the mold and, on its outer face, rounded projections axially aligned with such depressions. The rounded projections are then removed, as by a mechancial, chemical or electrochemical machining, together with a portion of the surrounding surface of the outer face, if necessary, to expose the holes in the spinnerette.

In the drawing which illustrates one method of carrying out the process of this invention:

FIGURE 1 is a diagrammatic cross-sectional view, in elevation, of the process for producing the mold from a master spinnerette;

FIGURE 2 is a diagrammatic cross-sectional view, also in elevation, of the process for producing the spinnerette from the mold.

Turning now to FIG. 1, reference numeral 1 designates a master, produced by carefully machining in a metal cup spaced orifices 2 which have conical countersunk portions 4 leading to cylindrical (capillary) portions 6. The transverse cross-section of the orifices 2 may be circular or may have special shapes, as discussed at the beginning of this specification. The master 1 is relatively thin; it may, for example, be 40 mils thick. The master 1 is mounted in an annular retaining ring 8 to form a receptacle for casting therein a liquid RTV (room temperature vulcanizing) silicone rubber, which fills the orifices 2 and builds up above the inner face of the master 1. The RTV silicone rubber is a fluid material well-known in the art, being a poly dimethylsiloxane having active sites which, on the addition of well-known catalysts cures, at room temperature, to form a solid rubber, by formation of siloxane cross links, as discussed in the book "Silicones" by Meals and Lewis, Reinhold Publishing Corp., 1961. One suitable RTV silicone rubber is named Silastic RTV 502, which is a semi-fluid material which, on the addition of stannous octoate thereto cures, at room temperature in about 30 minutes. Curing time may be shortened by heating. The shrinkage on curing is well below 5%, e.g. less than 1%, more specifically 0.2%.

If desired a portion of the RTV silicone rubber may be deposited in its fluid state above the master and sucked through the orifices, as by applying a partial vacuum to the outer face of the master 1. Thereafter a second portion of the silicone rubber in fluid state is deposited above the first portion and the excess which has been forced through the orifices 2 is removed by wiping the outer face of the master 1 with any suitable wiping material, e.g. absorbent paper towelling mounted on a flat rigid backing. Thereafter a backing member 10 is pressed against the upper part of the silicone rubber before the latter has cured, so that the rubber is forced up through large openings 12 in the member 10 to secure the member to the resulting cured negative mold 14. This member 10, which may be of metal or plastic, for example, serves to stiffen the negative mold 14 and provide an attaching surface for convenient mounting of the mold in subsequent operations.

After the RTV silicone rubber has cured, forming the negative mold 14, it is removed from contact with the master 1 and treated to form a thin conductive layer on its outer face. This is done conveniently by applying to the outer face a very thin layer of silver, which may be, for example, less than ½ micron, e.g. ¼ micron, in thickness, which may be produced in known manner, by applying to the outer face of the mold, after cleaning, a solution of ammoniacal silver nitrate and a reducing solution (e.g., a solution of granulated cane sugar in distilled water containing nitric acid). Best results are obtained when the latter solutions are chilled, e.g. to below 40° F. before the mold, which may be at room temperature, is brought into contact therewith. The silver film covers not only the flat face of the mold, but also the projections on the mold. The mold 14, to the silvered surface of which suitable contacts have been connected electrically, is mounted in an electroplating bath containing a nickel electroplating solution, of a type well-known in the art, such as that sold under the trademark "Levelume 220." A typical plating solution contains 40 ounces per gallon nickel sulfate, 7 ounces per gallon of nickel chloride and 6 ounces per gallon of boric acid. Another suitable plating solution contains nickel sulfamate. The plating solutions and the methods of using them for electroforming are well known in the art; see, for example, the book "Symposium on Electroforming—Applications, Uses and Properties of Electroformed Metals" published by American Society for Testing Materials in 1962, and particularly the chapter on "Modern Electroforming Solutions and Their Applications" by Diggin, in that book. Typical plating conditions, in which the silvered mold is the cathode, use a bath temperature of 140° F., a bath pH of 4.0, air agitation of the bath during plating, anodes of depolarized rolled carbon nickel with anode bags, a plating rate of 40 minutes per mil, and a current density of 30–40 amperes per square foot. The bath may also be agitated ultrasonically. It will be understood that in place of the nickel other metals may be used, e.g. chromium, cobalt, titanium or suitable alloys.

As shown in FIG. 2, the electroformed nickel deposit 20, preferably of a thickness of 0.03 to 0.25 inch, has protuberances 22 on its outer face, which protuberances are formed by the deposition of the nickel on the mold projections. These protuberances may be removed readily to expose the bottoms of the cylindrical part of the orifices, thus producing a spinnerette whose apertures are the exact replicas of the carefully machined orifices of the master 1. Removal of the protuberances 22 may be effected by grinding, chemical milling, electrolytic grinding, electric-discharge machining or other suitable method. It is preferable to also remove a thin layer of the metal of the whole outer face of the electroformed deposit to produce a smooth polished surface on the outer face.

It is advantageous to cut the flange of the cup-shaped deposit 20 to its final dimensions before the step of removal of the protuberances 22. This may be effected by mounting the assembly shown in FIG. 2 on the chuck of a lathe and cutting through the electroformed deposit, to make a circular cut at 24, or by shearing the deposit at 24.

The use of the silicone rubber for the mold makes it possible to remove the mold from the master without breaking or harming the tiny projections thereon, so that the shapes of the orifices in the final spinnerette will be maintained accurately. With more rigid mold materials, e.g. metals like Woods metal, the step of separating the mold from the master, even when done very carefully, results in damage to at least some of the many projections. Thus, if two orifices in the master 1 are not in absolutely perfect axial parallelism, the forces resulting from the displacement of the mold relative to the master will break off at least a part of one or more of the tiny projections; this will eventually produce a spinnerette in which some of the orifices may be suitable, but in which others are not of the same size or shape or are even blocked. Such a spinnerette is not suitable for the production of high quality yarn. When the rubber material is employed, the projections can yield and neckdown during their movements relative to the walls of the orifices during the separation of master and mold and will thereafter return precisely to their molded size and shape.

In place of the silicone rubber, other rubbery mold materials may be employed, preferably such as will cure, or vulcanize, without significant shrinking during the curing step and without the need for the application of high pressure during curing. The mold need not be made entirely of the rubber. Thus, the main body of the mold may be of other material, e.g. brass or plaster of Paris, and the rubber may be employed for only the outer surface or for only part of the outer surface. In another arrangement, a main mold body of rigid material may contain apertures, considerably larger in diameter than the apertures of the master but aligned therewith; through such apertures the fluid RTV silicone rubber may be cast, forming plugs in the main body, such plugs having integrally formed on their outer surface tiny projections which are negatives of the apertures in the master.

While it is preferred to make the surface of the mold conductive by a silvering technique, using the Brashear process, other methods, such as vacuum metallization, may be employed for applying conductive layers of such thinness that the orifice shape is not distorted. The conductive layer adheres to the electroformed deposit and may be removed in any suitable manner. Suitable conductive rubbers may also be employed without the need for application of the conductive layer. The conductive layer may be of the same metal as the electroformed deposit; for example, by vacuum metallizing a conductive layer of nickel may be deposited on the mold, following which nickel may be electroformed thereover; in this case, the conductive layer would not subsequently be removed from the electroformed nickel.

In one method for removing the protuberances 22 and exposing the orifices in the electroformed deposit 20, the deposit is mounted on the rotatable chuck of a precision lathe, with the face of the electroformed deposit disposed at right angles to the axis of rotation of the chuck; the grinding wheel of a precision grinder, e.g. a tool post grinder of known type, is then brought into contact first with the protuberances to remove them completely and then with the whole outer face of the electroformed deposit to remove a surface layer of the metal and expose the orifices. To minimize any tearing or filling of the orifice outlets by the grinding operation, the depressions in the unfinished electroformed deposit 20 may be filled, before the final machining, with a suitable filler, preferably a hard machinable substance such as an epoxy resin (which may be poured into the depressions and then cured to harden it in situ). Such filling may be done before the orifices are exposed or when they have been first exposed and before the final finishing of the outer surface. After grinding, the outer surface may be buffed or lapped to bring it to a high polish and remove any burrs. The hard filler in the orifices may then be removed, as by decomposing chemically or by heat.

A suitable epoxy resin is the well known thermosetting reaction product of bis-phenol-A and epichlorohydrin, which may be cured by admixture with catalysts of a type well known to the art; such epoxy resins are commonly sold under the trade name "Epon," e.g. "Epon 826."

It is advantageous to make the master thicker than the desired spinnerette so that the "capillary" portions of the mold projections will be longer than the capillaries in the finished spinnerette. In this case, the removal of metal from the outer face of the electroformed deposits should be continued until the capillary length is reduced to the desired value.

While the electrodeposition of the metal of the spinnerette is relatively slow, it is extremely economical. Thus a large number of molds may be made easily from a single master, and the many molds may be mounted on a large rack in a single electroplating bath.

It will be understood, of course, by those skilled in the art that the present invention is not limited to the use of the specific ingredients, proportions thereof, temperature, time and other conditions of reaction that are given in the foregoing detailed description and examples by way of illustration.

The embodiments of the invention in which an exclusive property or privilege is claimed are defined as follows:

1. Process for the production of spinnerettes having orifices for the extrusion therethrough of filament-forming material, which comprises forming a mold having spaced projections which are negatives of said orifices, said projections being made of a rubbery polymer, and gradually electrodepositing on said mold a layer of coherent metal of a thickness of at least about 0.03 inch, said layer having protuberances aligned with said projections, and removing said protuberances to expose the apertures formed by said projections.

2. Process for the production of spinnerettes having orifices with capillary portions whose diameters are in the range of 15 to 75 microns, which comprises forming a mold having spaced projections whose lengths are in the range of about 5 to 75 microns which are negatives of said orifices, said projections being made of a rubbery polymer, and gradually electrodepositing on said mold a layer of coherent metal of a thickness in the range of 0.03 to 0.25 inch, said layer having protuberances aligned with said projections, and removing said protuberances to expose the apertures formed by said projections.

3. Process as set forth in claim 2, in which said rubbery polymer is a polysiloxane.

4. Process for the production of spinnerettes having orifices with capillary portions whose diameters are in the range of 15 to 75 microns which comprises depositing a curable rubbery polymer on one surface within the orifices of a master having orifices with capillary portions of said size, curing said polymer in situ to form a mold having spaced rubber projections, whose lengths are in the range of about 5 to 75 microns, within said orifices, physically separating said mold and said master, said projections flexing during said separation, electrodepositing on said mold a layer of coherent metal of a thickness in the range of 0.03 to 0.25 inch, said layer having protuberances aligned with said projections, and removing said protuberances to expose apertures formed by said projections.

5. Process as set forth in claim 2 in which said mold is formed by a process comprising depositing a room temperature vulcanizing fluid silicone rubber against a master having orifices with capillary portions of said size and permitting said rubber to cure in the orifices of said master and removing said mold after curing, and in which said gradual electrodeposition of metal is effected by silvering said mold to render its surface conductive and electroforming a layer of nickel onto said surface to form a layer of coherent nickel having unperforated protuberances aligned with said mold projections, and in which the metal from said protuberances is thereafter removed to expose the apertures formed by said projections.

References Cited

UNITED STATES PATENTS

| | | | |
|---|---|---|---|
| 1,986,637 | 1/1935 | L'Hollier | 204—4 |
| 2,148,221 | 2/1939 | Schneider | 153—21 |
| 3,167,489 | 1/1965 | Hadjian | 204—11 |

JOHN H. MACK, *Primary Examiner.*

HOWARD S. WILLIAMS, *Examiner.*

D. R. VALENTINE, *Assistant Examiner.*